(12) United States Patent
Luo et al.

(10) Patent No.: US 11,799,555 B2
(45) Date of Patent: Oct. 24, 2023

(54) MULTI-CHANNEL LIGHT EMITTING MODULE INCLUDING LITHIUM NIOBATE MODULATOR

(71) Applicant: Global Technology Inc., Ningbo (CN)

(72) Inventors: Jian-Hong Luo, Ningbo (CN); Dong-Biao Jiang, Ningbo (CN); Juan Zhang, Ningbo (CN); Jiahang Shao, Ningbo (CN)

(73) Assignee: Global Technology Inc., Ningbo (CN)

( * ) Notice: Subject to any disclaimer, the term of this patent is extended or adjusted under 35 U.S.C. 154(b) by 0 days.

(21) Appl. No.: 17/725,631

(22) Filed: Apr. 21, 2022

(65) Prior Publication Data
US 2023/0155684 A1    May 18, 2023

(30) Foreign Application Priority Data

Nov. 15, 2021   (CN) .......................... 202111345406.X

(51) Int. Cl.
| | | |
|---|---|---|
| H04B 10/50 | (2013.01) | |
| H04B 10/572 | (2013.01) | |
| H04B 10/25 | (2013.01) | |
| G02F 1/25 | (2006.01) | |
| H04J 14/02 | (2006.01) | |

(52) U.S. Cl.
CPC ............ *H04B 10/506* (2013.01); *G02F 1/25* (2013.01); *H04B 10/2589* (2020.05); *H04B 10/572* (2013.01); *H04J 14/0204* (2013.01); *G02F 2202/20* (2013.01); *G02F 2203/58* (2013.01)

(58) Field of Classification Search
None
See application file for complete search history.

(56) References Cited

U.S. PATENT DOCUMENTS

| | | | | |
|---|---|---|---|---|
| 2004/0218927 | A1* | 11/2004 | Kim ................... | H04Q 11/0005 398/87 |
| 2005/0094255 | A1* | 5/2005 | Stephens .............. | H04B 10/298 359/337.5 |
| 2015/0050020 | A1* | 2/2015 | Tanaka ................. | H04B 10/564 398/79 |
| 2015/0318952 | A1* | 11/2015 | Butrie ................. | H04B 10/503 398/139 |
| 2020/0041824 | A1* | 2/2020 | Ohmori .................. | G02F 1/035 |

* cited by examiner

*Primary Examiner* — David W Lambert
(74) *Attorney, Agent, or Firm* — Grossman Tucker Perreault & Pfleger, PLLC

(57) ABSTRACT

A multi-channel light emitting module includes a base, at least one light emitting unit provided on the base, an optical modulation chip provided on the base, and an optical transmission component. The optical modulation chip includes an encapsulation structure and a thin film lithium niobate (LiNbOx) modulator provided in the encapsulation structure. The thin film LiNbOx modulator is optically coupled with the at least one light emitting unit, and the light emitting unit is provided outside the encapsulation structure. The optical transmission component is optically coupled with the thin film LiNbOx modulator.

14 Claims, 3 Drawing Sheets

MULTI-CHANNEL LIGHT EMITTING MODULE INCLUDING LITHIUM NIOBATE MODULATOR

CROSS-REFERENCE TO RELATED APPLICATIONS

This non-provisional application claims priority under 35 U.S.C. § 119(a) on Patent Application No(s). 202111345406.X filed in China on Nov. 15, 2021, the entire contents of which are hereby incorporated by reference.

BACKGROUND

Technical Field

The present disclosure relates to optical communication device, more particularly, a multi-channel light emitting module in an optical communication device.

Related Art

Optical transceivers are generally installed in electronic communication facilities in modern high-speed communication networks. With the improvement of optical communication system and the increase in demand of broad bandwidth by various network services, issues of insufficient internal space and high energy consumption of the conventional optical communication systems need to be tackled. Any solution to provide the small size optical communication systems at minimum expense of internal accommodation space and energy consumption without sacrificing both the bandwidth and transmission speed has been one of the important topics in this technical field.

In some optical communication systems for broadband applications, such as data centers and FTTH modems, one or more optical modulators are used to adjust the power, phase, or polarization of the optical signal in order to improve signal transmission efficiency and increase transmission distance. In the conventional optical communication systems, the optical modulator is mostly a silicon-based modulator due to cost considerations, since optical components, such as light emitters, lenses, optical isolators and the like, can be integrated with the silicon-based modulator into a single encapsulation structure for packaging, thereby facilitating miniaturization of the optical communication systems.

SUMMARY

According to one aspect of the present disclosure, a multi-channel light emitting module includes a base, at least one light emitting unit provided on the base, an optical modulation chip provided on the base, and an optical transmission component. The optical modulation chip includes an encapsulation structure and a thin film lithium niobate (LiNbOx) modulator provided in the encapsulation structure. The thin film LiNbOx modulator is optically coupled with the at least one light emitting unit, and the at least one light emitting unit is provided outside the encapsulation structure. The optical transmission component is optically coupled with the thin film LiNbOx modulator.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

Figure 1:
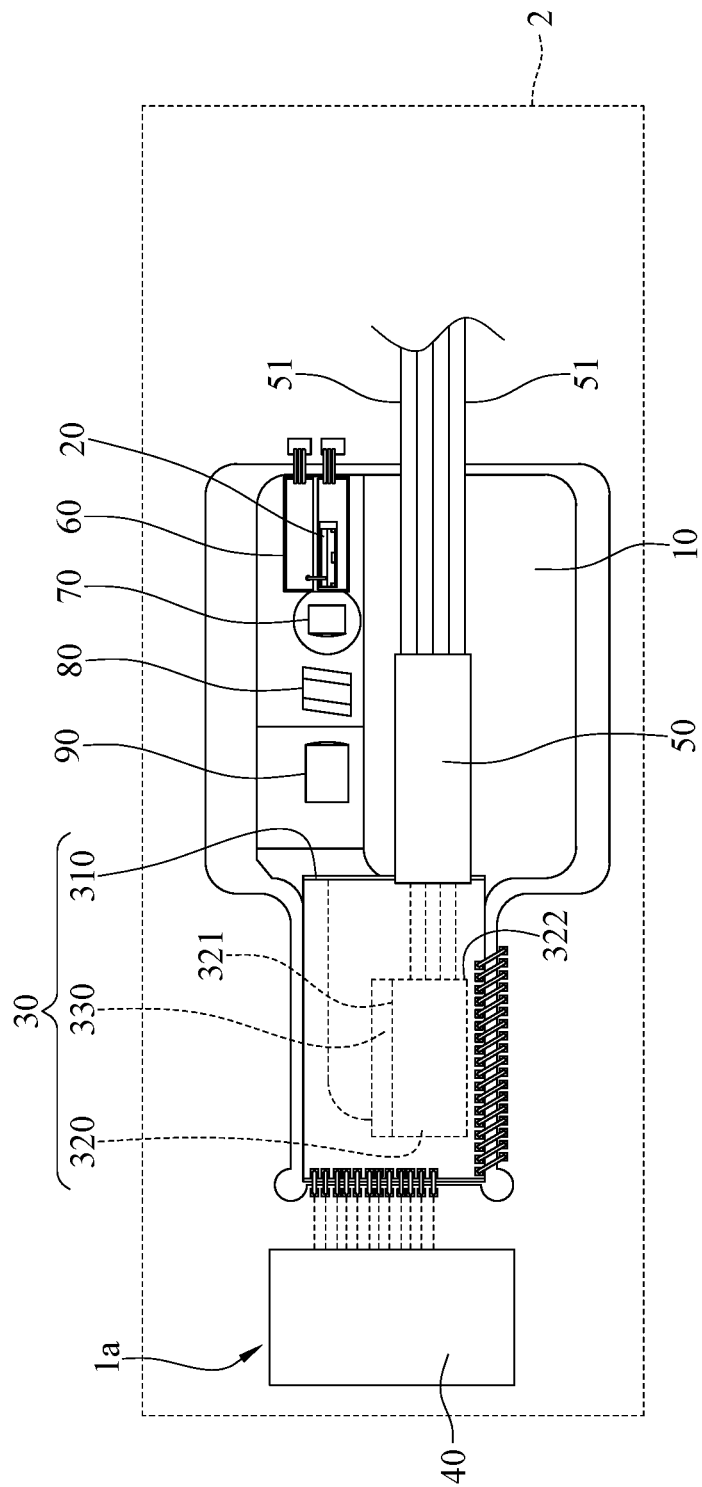
FIG. 1 is a schematic view of a multi-channel light emitting module according to one embodiment of the present disclosure.

A multi-channel light emitting module according to an embodiment of the present disclosure may include a base, at least one light emitting unit and an optical modulation chip. Please refer to FIG. 1 illustrating a schematic view of a multi-channel light emitting module according to one embodiment of the present disclosure. In this embodiment, a multi-channel light emitting module 1a may include a base 10, at least one light emitting unit 20 and an optical modulation chip 30. The multi-channel light emitting module 1a may be mounted on a driver circuit board 2.

The base 10 may be a carrier for supporting the driver circuit board 2, and the base 10 may be made of metal for heat dissipation. The light emitting unit 20 may be a laser emitter mounted on the base 10. FIG. 1 exemplarily shows that the multi-channel light emitting module 1a includes single light emitting unit 20, while the present disclosure is not limited by the number of light emitting unit 20. The optical modulation chip 30 may be mounted on the base 10 and include an encapsulation structure 310 and a thin film lithium niobate (LiNbO3) modulator 320 located in the encapsulation structure 310. The encapsulation structure 310 may be an airtight casing or an electrically insulated dielectric layer for accommodating the thin film LiNbO3 modulator 320. The thin film LiNbO3 modulator 320 may be optically coupled with the light emitting unit 20, and the light emitting unit 20 may be located outside the encapsulation structure 310.

A multi-channel light emitting module according to an embodiment of the present disclosure may include a driver chip. As shown in FIG. 1, the multi-channel light emitting module 1a may include a driver chip 40 electrically connected with the optical modulation chip 30. Specifically, the optical modulation chip 30 may be electrically connected with the driver chip 40 through pins or gold wires which physically touch the driver circuit board 2, thereby generating a path for supplying electric power to the optical modulation chip 30 from the driver chip 40 and transmitting modulated signals. The driver chip 40 is located outside the base 10. In other words, the driver ship 40 is not accommodated inside the base 10.

An optical modulation chip of a multi-channel light emitting module according to an embodiment of the present disclosure may include an optical splitter. As shown in FIG. 1, the optical modulation chip 30 may include an optical splitter 330 located at an optical input end 321 of the thin film LiNbO3 modulator 320. The optical splitter 330 may be accommodated in the encapsulation structure 310. Alternatively, the optical splitter 330 may be integrated into the optical modulation chip 30. The optical splitter 330 can split a single input channel wavelength provided by the light emitting unit 20 into four output channels of wavelengths for multi-channel transmission.

A multi-channel light emitting module according to an embodiment of the present disclosure may include an optical transmission component. As shown in FIG. 1, the multi-channel light emitting module 1a may include an optical transmission component 50 mounted on the base 10. The optical transmission component 50 may be optically coupled with the thin film LiNbO3 modulator 320 of the optical modulation chip 30, so that optical signals modulated by the optical modulation chip 30 are transmitted from an optical output end 322 of the thin film LiNbO3 modulator 320 through the optical transmission component 50 and received by an external device such as optical connector, optical switch and router. In this embodiment, the optical transmission component 50 may include a fiber array located outside the encapsulation structure 310. In other words, the fiber array is not accommodated in the encapsulation structure 310.

Also, the multi-channel light emitting module 1a may include a heat sink 60, a collimating lens 70, an optical isolator 80 and a focusing lens 90. The heat sink 60 is configured to carry the light emitting unit 20 and help heat dissipation. The light emitting unit 20 is optically coupled with the optical modulation chip 30 through the collimating lens 70, the optical isolator 80 and the focusing lens 90.

The multi-channel light emitting module 1a may be implemented in terms of "one input to four output" typed optical communication. An optical signal emitted by the light emitting unit 20 and propagated in the single input channel is coupled into the optical modulation chip 30. In the optical modulation chip 30, the optical splitter 330 splits the optical signal propagated in the single input channel into four optical signals propagated in four independent channels, respectively. The optical signals propagated in the four channels are modulated by the thin film LiNbO3 modulator 320 so as to generate modulated optical signals propagated in the four output channels. The modulated optical signals are output from the thin film LiNbO3 modulator 320 and coupled into four optical fibers 51, respectively, through the optical transmission component 50 (fiber array). Thereafter, the modulated optical signals are output to the external device(s).

Figure 2:
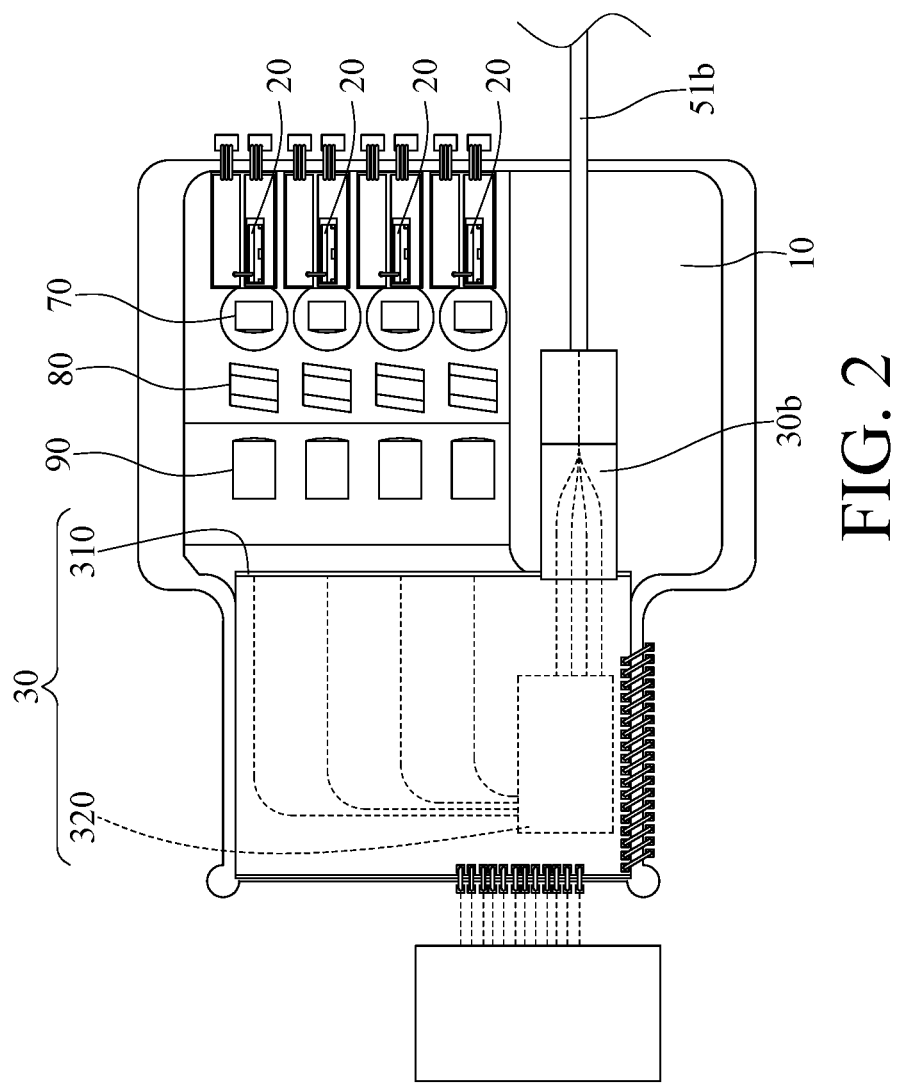
FIG. 2 is a schematic view of a multi-channel light emitting module according to another embodiment of the present disclosure.

A multi-channel light emitting module according to an embodiment of the present disclosure may include a wavelength division multiplexer. Please refer to FIG. 2 illustrating a schematic view of a multi-channel light emitting module according to another embodiment of the present disclosure. The specific configuration of each component in a multi-channel light emitting module 1b and its relative spatial position with respect to other components can be referred to the corresponding component in FIG. 1.

In this embodiment, the multi-channel light emitting module 1b may include a wavelength division multiplexer 30b mounted on the base 10. The wavelength division multiplexer 30b may include a plurality of arrayed waveguide gratings optically coupled with the thin film LiNbO3 modulator 320 of the optical modulation chip 30, and the wavelength division multiplexer 30b may be located outside the encapsulation structure 310. In other words, the wavelength division multiplexer 30b may be an external wavelength division multiplexer with respect to the optical modulation chip 30.

In this embodiment, the multi-channel light emitting module 1b may include multiple light emitting units 20 with different emission wavelengths. FIG. 2 exemplarily shows a total of four light emitting units 20 emitting infrared lights in wavelengths peaking at 1270 nm, 1290 nm, 1310 nm and 1330 nm, respectively, and the four light emitting units 20 are configured to be four output channels for the multi-channel transmission. More specifically, each light emitting unit 20 may be an infrared laser emitter. Furthermore, the multi-channel light emitting module 1b may include an optical transmission component 51b coupled with the optical modulation chip 30, and the optical transmission component 51b may include a single core fiber.

The multi-channel light emitting module 1b may be implemented in terms of "four input to one output" typed optical communication. The optical signals generated by the four light emitting units 20 are propagated through respective collimating lenses 70, optical isolators 80 and focusing lenses 90 before being coupled into the optical modulation chip 30. In the optical modulation chip 30, the optical signals propagated in the four channels are modulated by the thin film LiNbO3 modulator 320 so as to generate modulated optical signals. The modulated light signals are output from the thin film LiNbO3 modulator 320 and pass through the wavelength division multiplexer 30b. The wavelength division multiplexer 30b may combine the modulated light signals into a single output channel propagated in the optical transmission component 51b (such as the single core fiber), before the optical signals are output to the external device(s).

Figure 3:
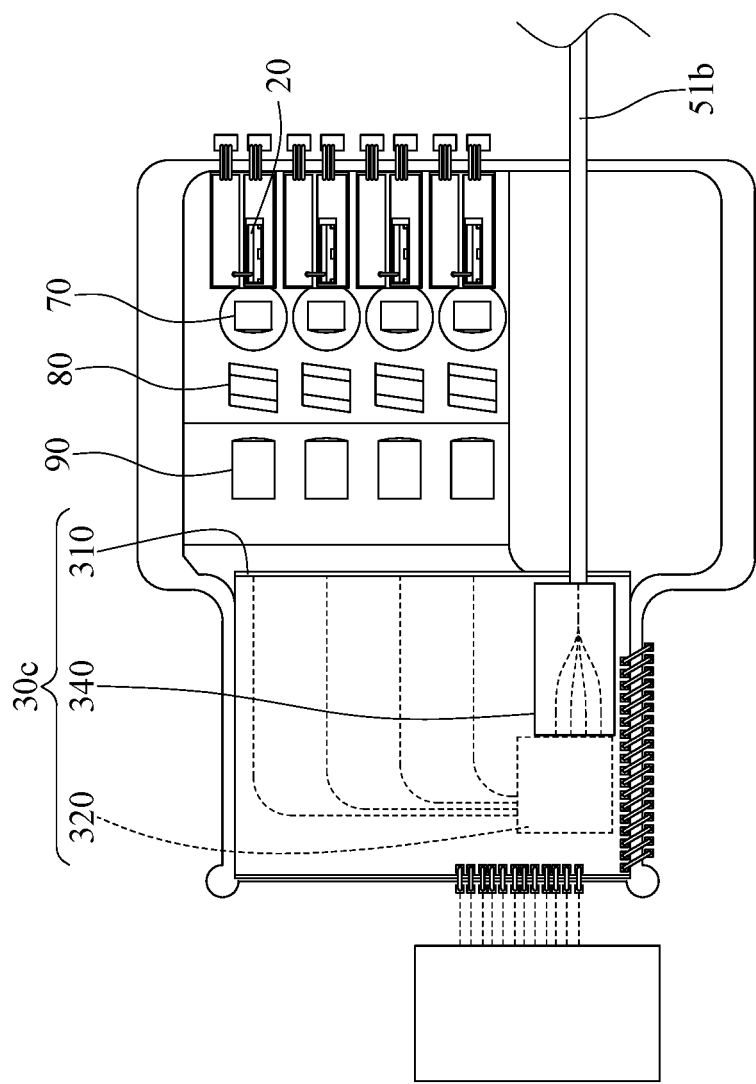
FIG. 3 is a schematic view of a multi-channel light emitting module according to still another embodiment of the present disclosure.

FIG. 3 is a schematic view of a multi-channel light emitting module according to still another embodiment of the present disclosure. The specific configuration of each component in a multi-channel light emitting module 1c and its relative spatial position with respect to other components can be referred to the corresponding component in FIG. 1 or FIG. 2.

In this embodiment, an optical modulation chip 30c of the multi-channel light emitting module 1c may include a wavelength division multiplexer 340 optically coupled with the thin film LiNbO3 modulator 320. The wavelength division multiplexer 340 may be accommodated in the encapsulation structure 310. In other words, the wavelength division multiplexor 340 may be integrated with the thin film LiNbO3 modulator 320 or separately with the same but within the optical modulation chip 30c.

The multi-channel light emitting module 1c may be implemented in terms of "four input to one output" typed optical communication. The optical signals generated by the four light emitting units 20 are propagated through respective collimating lenses 70, optical isolators 80 and focusing lenses 90 and then coupled into the optical modulation chip 30c. In the optical modulation chip 30c, the optical signals propagated in the four channels are modulated by the thin film LiNbO3 modulator 320. The modulated light signals are output from the thin film LiNbO3 modulator 320 and pass through the wavelength division multiplexer 340. The wavelength division multiplexer 340 may combine the modulated light signals into a single output channel propagated in the optical transmission component 51b (such as the single core fiber), before the optical signals are output to the external device(s).

The aforementioned specific embodiments describe various multi-channel light emitting modules of either one input to four output or four input to one output, but the present disclosure is not limited thereto. Base on different requirements, the multi-channel light emitting module disclosed therein can be designed in a type of four input to four output or two input to eight output by adjusting the number of light emitting units or providing additional optical splitter.

According to the present disclosure, the thin film LiNbO3 modulator is used for the modulation of optical signals, and the thin film LiNbO3 modulator enjoys the advantages of compactness and high modulation efficiency. The optical modulation chip including the thin film LiNbO3 modulator can achieve a high data rate of 100 Gbps or more for the single channel. The optical modulation chip applied to the optical communication system can reduce manufacturing cost and improve signal transmission performance. With the compact thin film LiNbO3 modulator, the multi-channel light emitting module incorporating this LiNbO3 modulator could be small in size. In the meantime, some optical components, such as the light emitting unit, could be moved outside the optical modulation chip instead of being integrating them into the optical modulation chip, to help properly dissipate the heat generated by the optical components.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A multi-channel light emitting module, comprising:
   a base;
   at least one light emitting unit provided on the base;
   an optical modulation chip provided on the base, wherein the optical modulation chip comprises an encapsulation structure and a thin film lithium niobate (LiNbOx) modulator provided in the encapsulation structure, the thin film LiNbOx modulator is optically coupled with the at least one light emitting unit, and the at least one light emitting unit is provided outside the optical modulation chip; and
   an optical transmission component optically coupled with the thin film LiNbOx modulator.

2. The multi-channel light emitting module according to claim 1, further comprising a driver chip electrically connected with the optical modulation chip, and the driver chip is provided in the base.

3. The multi-channel light emitting module according to claim 1, wherein the optical modulation chip further comprises an optical splitter, and the optical splitter is provided at an optical input end of the thin film LiNbOx modulator.

4. The multi-channel light emitting module according to claim 3, wherein the optical transmission component comprises a fiber array provided on the base, and the fiber array is provided outside the encapsulation structure.

5. The multi-channel light emitting module according to claim 1, further comprising a wavelength division multiplexer (WDM) provided in the base, wherein the WDM is optically coupled with the thin film LiNbOx modulator of the optical modulation chip, and the WDM is provided outside the encapsulation structure.

6. The multi-channel light emitting module according to claim 1, wherein the optical modulation chip further comprises a WDM optically coupled with the thin film LiNbOx modulator, and the WDM is provided in the encapsulation structure.

7. The multi-channel light emitting module according to claim 1, wherein the at least one light emitting unit comprises a plurality of light emitting units, and the plurality of light emitting units emit light with different wavelengths.

8. The multi-channel light emitting module according to claim 1, wherein the at least one light emitting unit emits an infrared light.

9. The multi-channel light emitting module according to claim 1, wherein the optical transmission component comprises a single core fiber optically coupled with the thin film LiNbOx modulator of the optical modulation chip.

10. The multi-channel light emitting module according to claim 1, wherein the base is made of metal.

11. The multi-channel light emitting module according to claim 1, wherein each channel of the multi-channel light emitting module has a multi-channel light emitting module data rate of 100 Gbps or more.

12. The multi-channel light emitting module according to claim 1, wherein the encapsulation structure is an airtight casing.

13. The multi-channel light emitting module according to claim 1, wherein the encapsulation structure comprises an electrically insulated dielectric layer.

14. The multi-channel light emitting module according to claim 3, wherein the optical splitter is accommodated in the encapsulation structure.

* * * * *